July 23, 1963 G. WANINGER 3,098,349
LINKAGE WITH MEANS INCLUDING AUXILIARY LINKS
LIMITING FLEXIBILITY IN TWO DIRECTIONS
Filed June 4, 1959 3 Sheets-Sheet 1
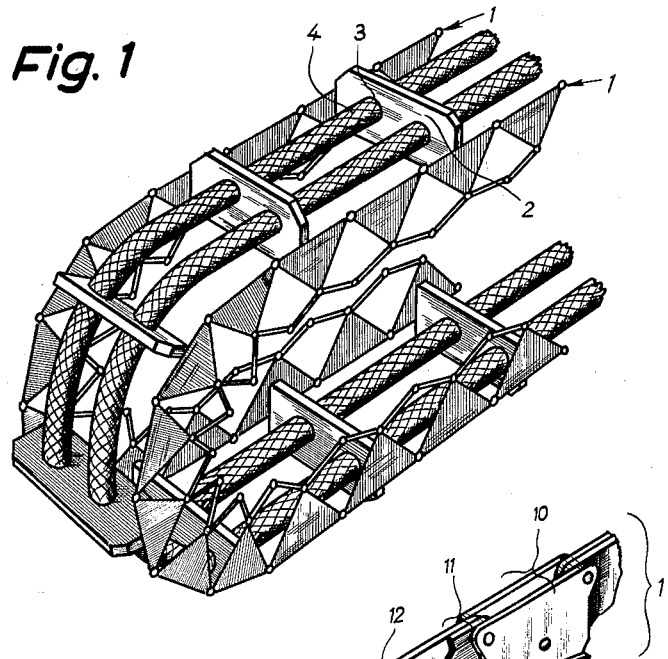
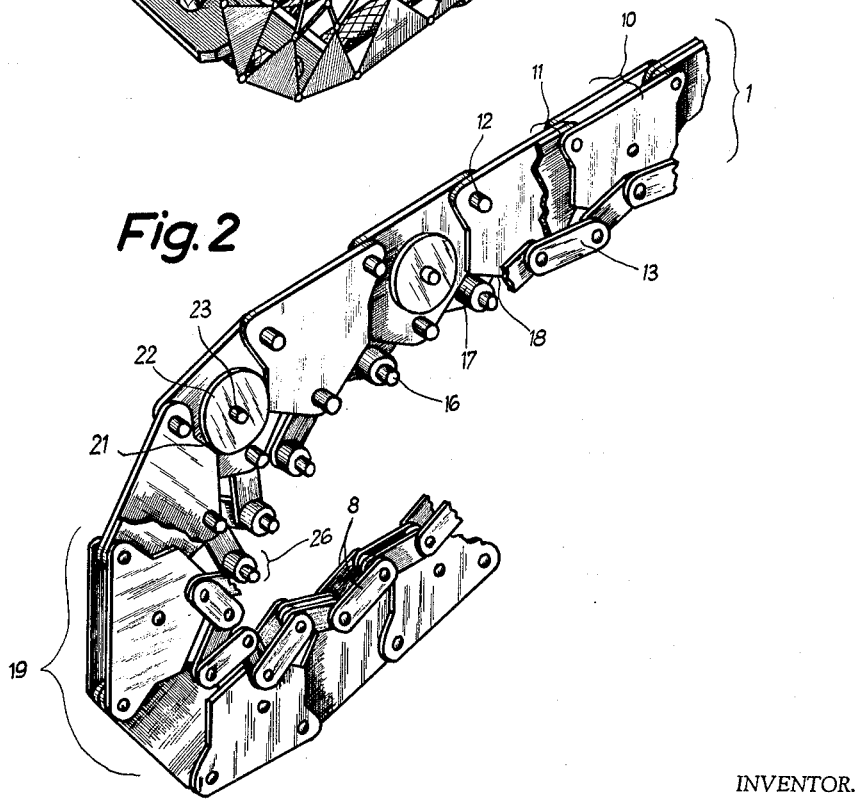
INVENTOR.
BY July 23, 1963  G. WANINGER  3,098,349
LINKAGE WITH MEANS INCLUDING AUXILIARY LINKS
LIMITING FLEXIBILITY IN TWO DIRECTIONS
Filed June 4, 1959  3 Sheets-Sheet 2
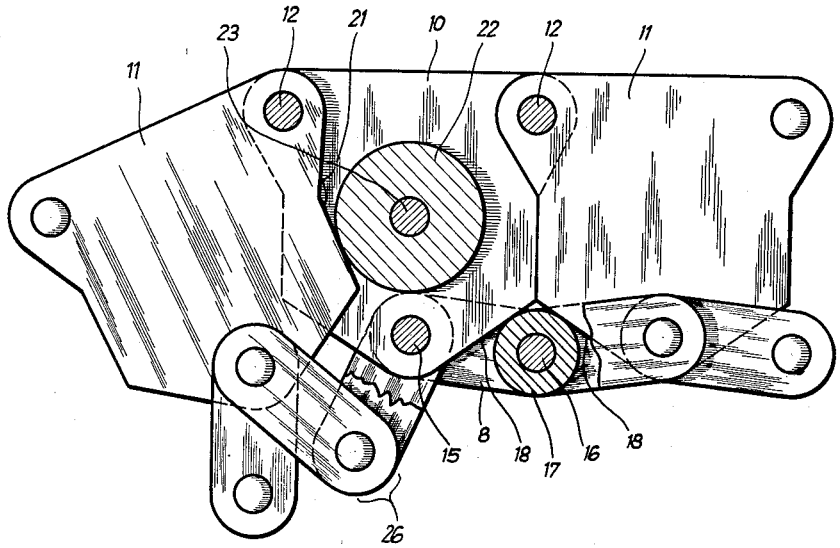
*Fig. 3*
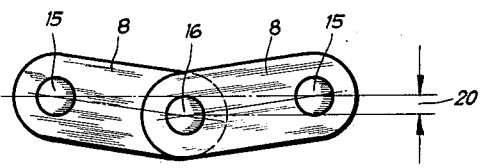
*Fig. 4*
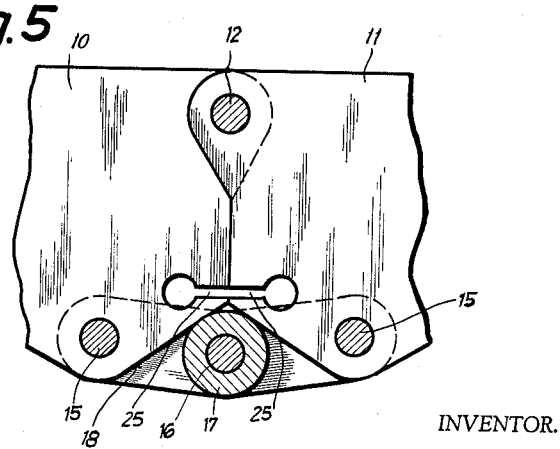
*Fig. 5*
*Fig. 6*
INVENTOR.
BY July 23, 1963 G. WANINGER 3,098,349
LINKAGE WITH MEANS INCLUDING AUXILIARY LINKS
LIMITING FLEXIBILITY IN TWO DIRECTIONS
Filed June 4, 1959 3 Sheets-Sheet 3

INVENTOR.

BY

United States Patent Office 3,098,349
Patented July 23, 1963

3,098,349
LINKAGE WITH MEANS INCLUDING AUXILIARY LINKS LIMITING FLEXIBILITY IN TWO DIRECTIONS
Gilbert Waninger, Ettlingen, Baden, Germany, assignor to Kabelschlepp G.m.b.H., Siegen, Westphalia, Germany
Filed June 4, 1959, Ser. No. 818,226
Claims priority, application Germany June 7, 1958
6 Claims. (Cl. 59—78.1)

The present invention relates to the supporting, conveying, and guiding, i.e. feeding of flexible elongated cables and conduits for the transmission of energy, for instance in the form of electric current, or liquid or gaseous media to movable members such as machine tool carriages or crane carriages or the like. Further, this invention relates to protecting the flexible cable and conduits against stresses and damage from outside influences during the feeding.

Devices have been suggested according to which conduits are supported by cross stays arranged between two chain bands, said cables and conduits positioned by the cross stays being so that there is no change in length between the conduits and the chain links for certain radii of curvature, that is, the cables and conduits lie in the plane in which the pivots of the chain links are located. The chain bands are so designed that in one direction of bending the radius of curvature is limited to a predetermined minimum value, whereas for the other direction of bending the radius of curvature may be selected "infinite" so that the chain remains straight. Such a construction protects the conduits or cables against pull, pressure, wear, bending or loop formation in the respective curvatures or bends of the path. Furthermore, an automatic and precise movement of the conduits or conductors will be obtained between the movable and the stationary connection. Such conveyors, having laterally spaced chains with cable and conduit supporting cross stays connected therebetween are referred to as "cable drag chains."

It is an object of the present invention to provide a simplified cable drag chain or supporting and guiding device of the above mentioned type.

It is also an object of this invention to provide a supporting and guiding device of the above mentioned type which will be highly economic in construction and will require a relatively short production time.

These and other objects and advantages of the invention will appear more clearly from the following specification in connection with the accompanying drawings, in which:

FIG. 1 is a perspective view of a cable drag chain with diagrammatic illustration of the chain bands.

FIG. 2 is a perspective view of a portion of a chain band.

FIG. 3 shows on a somewhat larger scale than FIGS. 1 and 2 a chain portion composed of three links.

FIG. 4 illustrates the system of the pilot link.

FIG. 5 is a chain link design with adjusting means for the stretched chain.

FIG. 6 shows a modified blocking disc.

*General Arrangement*

Figure 7:
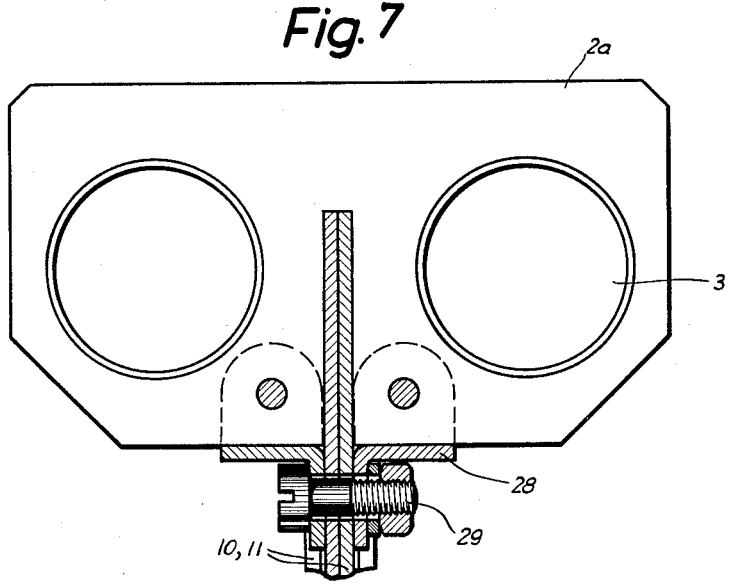
FIG. 7 represents a section through a single band for use in connection with the invention.

In order to insure a simple construction and a fast and economic production of a cable drag chain device according to the invention, that side of the chain band on the side toward which the device bends has pilot links arranged between two adjacent link plates while the bolts pertaining to said pilot links are provided with an abutment disc or the like for engaging the abutment edges of the link plates. The diameter of the abutment disc is so selected that two adjacent pilot links will form an obtuse angle with each other when the chain is in its stretched or straight condition. By means of the said pilot links, great precision of location of the chain links relatively can be obtained with the device in stretched-out or straight condition so that the device will not be arched either downwardly or upwardly.

In order to determine the radius of curvature to which the device will be limited in bending, according to the present invention, an exchangeable blocking disc is arranged between adjacent outer links. It is this blocking disc against which the abutment edges of the inner link will rest during the curvature of the chain. By varying the diameter of the blocking disc, various radii of curvature can be realized without difficulties.

With a chain according to the present invention, it is possible to design all flat individual parts of the chain such as the link plates, links, abutment discs, and blocking discs as plane structural elements which may preferably be produced by stamping. The manufacture of such a chain is considerably more economic than the manufacture of heretofore known similar chains.

*Structural Arrangement*

Referring now to the drawings, the complete cable drag chain comprises one or more chain bands. When employing two or more chain bands 1, these bands have arranged therebetween cross stays 2 which may be provided with bores 3 receiving the conduits, cables 4, hoses or the like to be guided and supported. The chain bands 1 comprise main links which are linked to each other by means of the main joints. That side of the main links which is directed toward the side toward which the device bends has arranged pilot links at the intermediate joints, said pilot links being movably interconnected by pilot joints.

The operation of the pilot link chain bands will be obvious from FIGS. 2 to 4 showing the said band and its elements in operative form. In order to maintain the symmetry of the chain, the main links 5 are made up of identical link plates 10, 11 which are, as usual with each chain, arranged in pairs. The arrangement is such that one pair of link plates 11 has the plates arranged directly adjacent to each other to form an inner link pair 11 which enters between the link plates of an adjacent link pair 10 in which the link plates are spaced. The inner link pair 11 is linked to the outer link pair 10 by the main joints. Similarly, for reasons of symmetry, the pilot links 8 are composed of individual links 13 and by means of intermediate pins are suspended on the main link pairs 10 and 11. The pilot links 8 are linked to each other by means of pins 16. The bolts 16 carry abutment discs 17 between the individual links 8. When the chain band 1 is in straight or stretched condition, the abutment edges 18 of plates 10, 11 rest against the adjacent abutment discs 17 so that the pilot links 8, made up of the two individual links, cannot assume a stretched position with regard to each other but are, instead, buckled downwardly. The chain band 1 therefore remains straight in this position.

It will be appreciated that when the chain band 1 is in straight position, the pin 16 has to be spaced by the distance 20 (FIG. 4) from a straight line connecting the intermediate link bolts 15 in order to allow the links 8 to buckle downwardly into position 26 (FIG. 3) when the main link pairs 10 or 11 tilt relative to each other in order to form the chain curvature 19 (FIG. 2).

The radius of curvature of curvature 19 (FIG. 2) is determined by the angle formed by the main link pairs 10, 11 after effected tilting movement. This angle is determined by the engagement of the edges 21 of the inner links 11 with the periphery of a blocking disc 22. The said blocking disc 22 (FIG. 3) is fastened between the link plates of the outer links 10 by means of a pin 23.

The radius of curvature of the curvature 19 (FIG. 2) can easily be adjusted by inserting a blocking disc 22 with such a diameter as corresponds to the respective angular position of the main link pairs 10, 11 and the desired radius of curvature.

It will thus be appreciated that all elements of the chain band 1, with the exception of the blocking discs 22 remain the same even though the radius of curvature may be varied. The blocking discs 22 are simple discs with a bore and can be produced at low cost by stamping or automatic turning.

The embodiment shown in FIG. 5 represents a further simplification in the production of the link elements inasmuch as it allows inaccuracies without affecting the proper operation of the chain. The chain elements of FIG. 5 have retained their shape and function. However, the link plates 10, 11 are provided with a cutout 25 above the abutment edges 18. By adjusting means, for instance by special pliers, the cutout or recess 25 may be widened or narrowed thereby varying the position of the abutment edge 18 with regard to the link plates 10, 11. Such a variation results in changing the distance 20 (FIG. 4) whereby according to the geometric conditions, the distance between the intermediate link pins is increased or reduced thereby effecting a correction in the straight line condition of the chain.

A further possibility of correcting the straightness of the chain and thereby effecting a simplification in the production of the chain is obtained in conformity with the present invention by varying the diameter of the abutment discs 17. Such a variation brings about the same result as the deformation of the cutouts 25 (FIG. 5). The variation in the diameter of the abutment discs 17 may be effected for instance in conformity with the so-called selector system during the chain assembly by having in stock or available a plurality of abutment discs 17 with different diameters.

In conformity with FIG. 6, the blocking discs 22 may have the shape of a polygon 27 or a cam disc so that each two oppositely located sides of the polygon with the corresponding different distances $a$, $b$, $c$, will bring about certain but different radii of curvature. The radius of curvature will be selected by the installation of the blocking discs 22. It will thus be evident that in this way by means of a single blocking disc 22 of the shape shown in FIG. 6 a plurality of radii of curvature can be realized.

The employment of the links 8 of the abutment discs 17, and of the blocking discs 22 in the above mentioned manner will make it possible to design all chain links completely plane thereby considerably simplifying the production of the chain links. A precision is required merely as to the bores and the distances between the bores which requirement is easily met. With all abutment surfaces 18 and 21, for instance stamping precision is fully sufficient. The exposed abutment surface 18 is so located that in view of the geometric conditions, no particularly high requirements as to precision are to be met, in other words, stamping precision for instance will be fully sufficient. Furthermore, the above adjusting methods may be employed for the abutment surfaces 18.

Due to the arrangement of joints represented by pins 12, 15 and 16, no open gaps will form on the outer rims of chain band 1 during the passage of the band through curvatures or over straight paths. When the links 8 tilt outwardly in view of the bending of the chain, the said links 8 form inclines which will throw off foreign bodies or the hands of the operator so that disturbances by foreign bodies will be greatly excluded and accidental damages to the operator will be avoided.

The chain links are subjected to relatively low stress. All links are completely at rest when the chain band 1 is either curved or straightened out. A link movement is effected only for a very short period when the main link pairs 10 and 11 move from the straightened portion into the curvature and when the links 8 tilt outwardly, or inversely, when the chain links move from the curvature into the straight path. During the instances of movement, the lowest possible load acts upon the main joints represented by pins 12, whereas the intermediate joints represented by pins 15 and joints represented by pins 16 are absolutely relieved. Thus, the wear of the links will be reduced to a minimum so that the operation of the chain will not be affected by undue wear.

Figure 8:
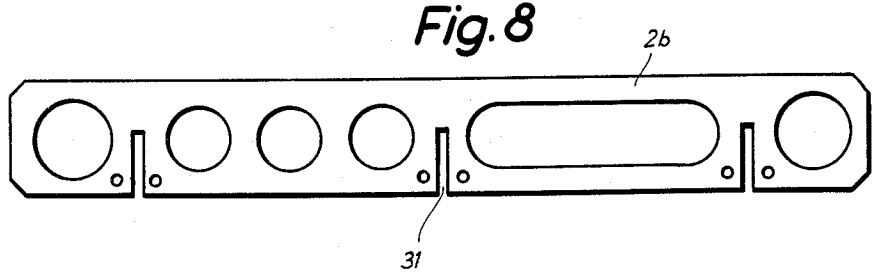
FIG. 8 is a view of a three-band attachment strap or bridge member.

The chain bands described so far may be designed as single bands (FIG. 7) or they may be designed in any desired width by arranging two or more chain bands 1 of FIG. 2 parallel to each other at a predetermined distance which is represented by the distances between the slits 31 shown in FIG. 8. The individual elements of the chains still remain the same as described above. With the single band, for instance, of the type shown in FIG. 7, the stays 2a are connected with the main link pairs 10, 11 by means of angle pieces 28 and pins 29. The stays 2a are arranged symmetrically with regard to the central longitudinal plane of the chain and are provided with bores 3 for receiving the cables or the like. FIGURE 8 shows a stay 2b for a triple band. Stay 2b is provided with three slits 31 so as to allow mounting of the stays upon the main link pairs 10, 11 of three parallel chain bands.

It is, of course, to be understood that the present invention is, by no means, limited to the particular constructions shown in the drawings but also comprises any modifications within the scope of the appended claims.

What I claim is:

1. In a chain band for a drag chain with self-supporting sections when moving along a straight line: a plurality of alternate first and second flat link plate means in end to end and overlapping relation, each of said first link plate means being formed of a pair of plates in straddling relation to the respective adjacent two second link plate means, first pivots pivotally interconnecting said first and second link plate means for tilting movement relative to each other to permit the chain band to pass along a curved path, a plurality of pairs of spaced parallel link members, said pairs being respectively associated with said first and second link plate means, the link members of each pair of link members having one end thereof in overlapping arrangement with regard to the link members of an adjacent pair, a plurality of second pivots respectively carried by said pairs of link members only, the overlapping ends of said adjacent pairs of link members being pivotally interconnected by a single one only of said second pivots, third pivots spaced from said first pivots and respectively pivotally connecting the other ends of each pair of link members with the respective adjacent first and second link plate means, and abutment means respectively carried by said second pivots only for abutment with the link plate means of the respective two adjacent link plate means when the latter move from a tilted position to a straightened out position, said chain band being constructed so that straight lines joining the centers of adjacent ones of the second and third pivots form a series of angles each having one of said second pivots at its vertex and opening toward one of said first pivots, each said angle being less than a straight angle in all positions of said chain to thereby assure buckling of the link members when the link plate means carrying the respective pair of link members tilt relative to each other.

2. A chain band according to claim 1 wherein second abutment means in the form of disc like members are provided and are mounted on the said first link plate means confined between the said plates thereof and in the planes of the said second link plate means located on opposite sides of the respective disc like member, said disc like members abutting the side edges of the said second link plate means located on opposite sides thereof when the chain band moves into a predetermined curved position thereby to limit the amount of curvature of the chain band whereby the chain band is also self supporting when moving along a curved path.

3. A chain band according to claim 2 in which said disc like members are rotatably supported between the said plates of said first link plate means and are of irregular polygonal shape with diagonals of different lengths.

4. A chain band according to claim 2 in which each of said third pivots is common to two adjacent pairs of link members whereby said pairs of links form a continuous chain.

5. In a chain band for a drag chain for cables, hoses, and the like: a plurality of first and second flat link plates in end to end overlapping relation, pivots interconnecting said link plates where they overlap so said plates are tiltable relative to each other to pass along a curved path, a plurality of pairs of flat pilot links, a plurality of connecting pins, the pilot links of each of said pairs of pilot links having mutually adjacent ends pivotally connected to each other by a respective one only of said connecting pins and having the other ends thereof respectively pivotally connected by others of the connecting pins to two mutually adjacent ones of said link plates at points spaced from said pivots and at that side of said link plates which faces the axis of curvature of the chain band when passing said link plates through a curved path, and abutment means carried by said one of said connecting pins for abutment with said adjacent link plates at a certain relative straightened-out position of said adjacent link plates, the abutment means being arranged for engaging abutment surfaces of said adjacent link plates when the said adjacent link plates form part of a substantially straight portion of said band, said surfaces forming an acute angle with a line parallel to the long axis of said straight band portion and said adjacent link plates having slot means therethrough undercutting said abutment surfaces to permit movement of the surfaces of varying the angle thereof with said direction of movement.

6. A chain band according to claim 5 in which said first link plates are formed of pairs of spaced plates receiving therebetween at the ends the intervening second link plates, and a blocking disc connected to and confined between each pair of spaced plates arranged to be abutted at opposite sides by the link plates pivoted to the respective pair of spaced plates to limit the tilting movement of adjacent link plates relative to each other.

References Cited in the file of this patent

UNITED STATES PATENTS

| | | |
|---|---|---|
| 467,481 | Hillebrand | Jan. 19, 1892 |
| 615,285 | Le Valley | Dec. 6, 1898 |
| 1,004,575 | Jones | Oct. 3, 1911 |
| 1,570,014 | Stevens | Jan. 19, 1926 |
| 1,851,747 | Aldeen et al. | Mar. 29, 1932 |
| 2,143,953 | Le Roy | Jan. 17, 1939 |
| 2,184,747 | Levai | Dec. 29, 1939 |
| 2,481,471 | Crot | Sept. 6, 1949 |
| 2,724,396 | Pereira | Nov. 22, 1955 |
| 2,727,723 | Beler | Dec. 20, 1955 |
| 2,792,930 | Graham | May 21, 1957 |
| 2,864,907 | Waninger | Dec. 16, 1958 |

FOREIGN PATENTS

| | | |
|---|---|---|
| 505,020 | France | Apr. 27, 1920 |